United States Patent
Faranda

(10) Patent No.: US 7,201,611 B2
(45) Date of Patent: Apr. 10, 2007

(54) DOCKING SYSTEM TO ATTACH AND RETAIN MULTIPLE ELECTRONIC DEVICES SIMULTANEOUSLY ON A SURFACE

(75) Inventor: Robert T. Faranda, Boxborough, MA (US)

(73) Assignee: Mobility Electronics, Inc., Scottsdale, AZ (US)

( * ) Notice: Subject to any disclaimer, the term of this patent is extended or adjusted under 35 U.S.C. 154(b) by 0 days.

(21) Appl. No.: 11/524,705

(22) Filed: Sep. 21, 2006

(65) Prior Publication Data
US 2007/0015418 A1    Jan. 18, 2007

Related U.S. Application Data

(63) Continuation-in-part of application No. 11/300,064, filed on Dec. 14, 2005, now Pat. No. 7,153,169, which is a continuation of application No. 10/790,877, filed on Mar. 2, 2004, now Pat. No. 6,976,885.

(51) Int. Cl.
*H01R 33/94* (2006.01)
(52) U.S. Cl. ............... 439/638; 439/540.1; 439/929
(58) Field of Classification Search ............ 320/114, 320/115; 439/527, 540.1, 638, 677, 678, 439/679, 680, 929
See application file for complete search history.

(56) References Cited

U.S. PATENT DOCUMENTS 5,030,129 A * 7/1991 Koch ............... 439/374
5,931,683 A * 8/1999 Pinel ............... 439/39
6,364,697 B1 * 4/2002 Tseng et al. ............... 439/533
6,461,181 B1 * 10/2002 Goh et al. ............... 439/289

OTHER PUBLICATIONS

Portable Power Station from Resource Inc.
iSphere Speaker Dock using ZipConnect System by Sharper Image.
iPulse Speaker Dock using SipConnect System by Sharper Image.
iFrame Dock using ZipConnect System by Sharper Image.
iTower Dock using ZipConnect System by Sharper Image.
CD Stero Solo Dock using ZipConnect System by Sharper Image.

* cited by examiner

*Primary Examiner*—Khiem Nguyen
(74) *Attorney, Agent, or Firm*—Jackson Walker LLP; Robert C. Klinger

(57) ABSTRACT

A platform having a raised support member including a plurality of spaced openings configured to securing receive device connectors. In one preferred embodiment, the raised member comprises an upwardly extending barrier shaped as a comb, formed by a plurality of slots adapted to selectively receive the connector. The connector has a predetermined power rating, and is keyed such that portable electronic devices configured to draw power at or below the power rating of the connector can be securingly and electrically coupled thereto. The platform may be angled upwardly to both support and present the portable electronic device to the user.

10 Claims, 1 Drawing Sheet

US 7,201,611 B2

DOCKING SYSTEM TO ATTACH AND RETAIN MULTIPLE ELECTRONIC DEVICES SIMULTANEOUSLY ON A SURFACE

CLAIM OF PRIORITY

This application is a continuation-in-part of U.S. patent application Ser. No. 11/300,064 entitled POWER COMPATIBLE UNIVERSAL POWER TIP filed Dec. 14, 2005 now U.S. Pat. No. 7,153,169, which is a continuation of Ser. No. 10/790,877 now U.S. Pat. No. 6,976,885 entitled KEYED UNIVERSAL POWER TIP AND POWER SOURCE CONNECTORS filed Mar. 2, 2004, the teaching of which are incorporated herein by reference.

FIELD OF THE INVENTION

The present invention is generally related to docking systems, and more particularly to docking systems for supporting and/or powering portable electronic devices.

BACKGROUND OF THE INVENTION

With the proliferation of portable electronic devices including PDA's, cell phones, MP3 players, digital cameras, gaming devices and so forth, certain docking systems have been created to help organize and power these devices. Currently available device docking systems implement a variety of architectures for both powering and coupling to portable electronic devices may include adjustable clamps to hold individual devices, specially sized recess pocket/cavities, and specially sized individual device adaptor sleeves. The adjustable clamps require complicated moving parts and require allocated space/clearance for a sliding mechanism. Recessed pockets need to be sized to accommodate the largest device, therefore, they are too large for smaller devices. Also, recessed pockets require a clearance feature on the bottom side for electrical connections and can be difficult to access. Recessed pockets do not allow for connections on alternate sides of devices, and they also take up a greater amount of space. Individual device adaptor sleeves require unique parts for each device and require a larger standard sized recessed pocket for the sleeve to engage.

SUMMARY OF INVENTION

The present invention achieves technical advantages as a platform having a raised support member including a plurality of spaced openings configured to securing receive powered device connectors. In one preferred embodiment, the raised member may comprise an upwardly extending barrier shaped as a comb, formed by a plurality of slots adapted to selectively receive the connector. The connector may be coupled to an interchangeable connector/tip having a predetermined power rating, which connector may be keyed such that portable electronic devices configured to draw power at or below the power rating of the connector can be securingly and electrically coupled thereto. The platform may be angled upwardly to both support and present the portable electronic device to the user.

DETAILED DESCRIPTION OF THE PRESENT INVENTION

Figure 1:
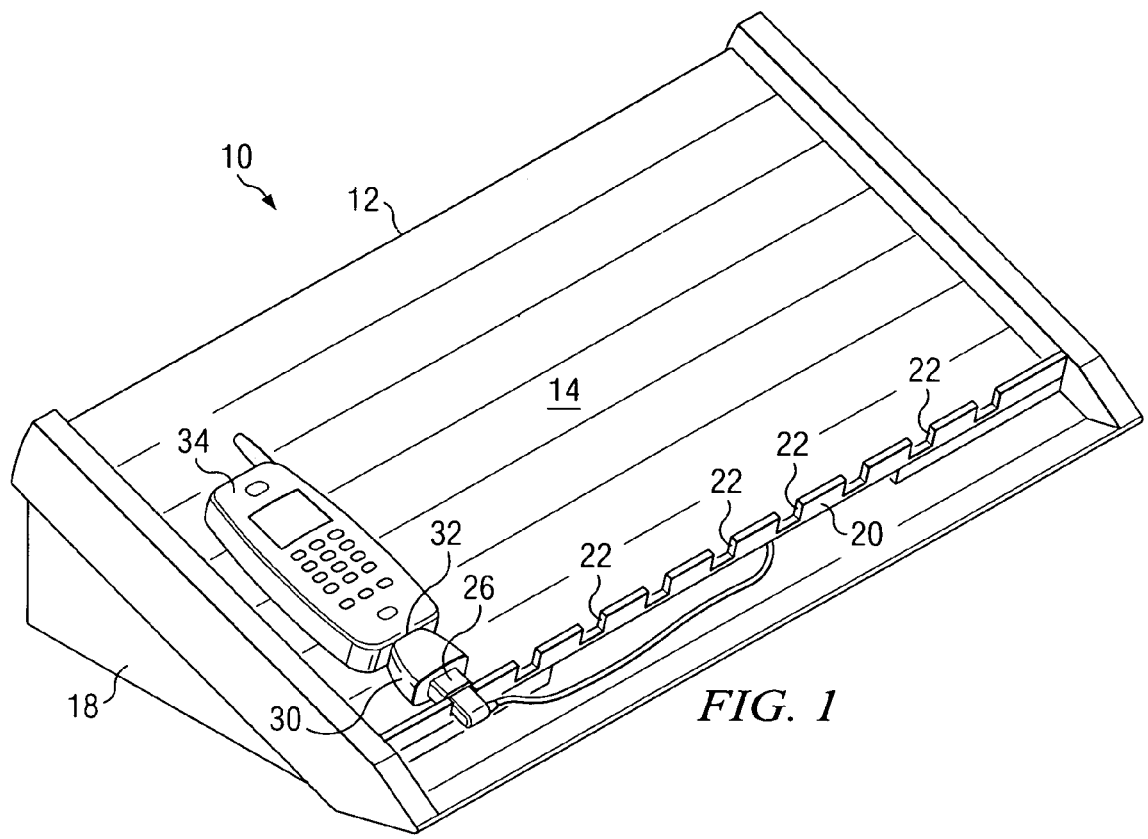
FIG. 1 is a perspective view of one exemplary embodiment of the present invention.

Referring now to FIG. 1, there is generally shown at 10 a platform 12 having an upper major surface 14, and being configured to extend upwardly due to opposing raised sides 18. Further provided is an elongated support member 20 extending across one end of the platform, and preferably at a lower portion of the angled platform as shown. The support member 20 is seen to include a plurality of spaced openings 22 configured as upwardly extending slots to create a comb-like securing member. Selectively secured in one or more of the slots 22 is electrical connector 26 having electrical interface 28 (FIG. 2) that is adapted to selectively mechanically and electrically couple to a device connector/tip 30, as shown. Device connector 30 may comprise of iTips™ manufactured by Mobility Electronics, Inc. of Scottsdale, Ariz., the assignee of the present invention, the teaching of which are taught in further detail in the parent application. In particular, each of the device tips 30 has an electrical connector 32 adapted to couple to a mating connector of the portable electronic device 34 such that only those portable electronic devices 34 configured to draw power at or below the power rating of the device tip 30 can be mechanically and electrically coupled thereto.

Figure 2:
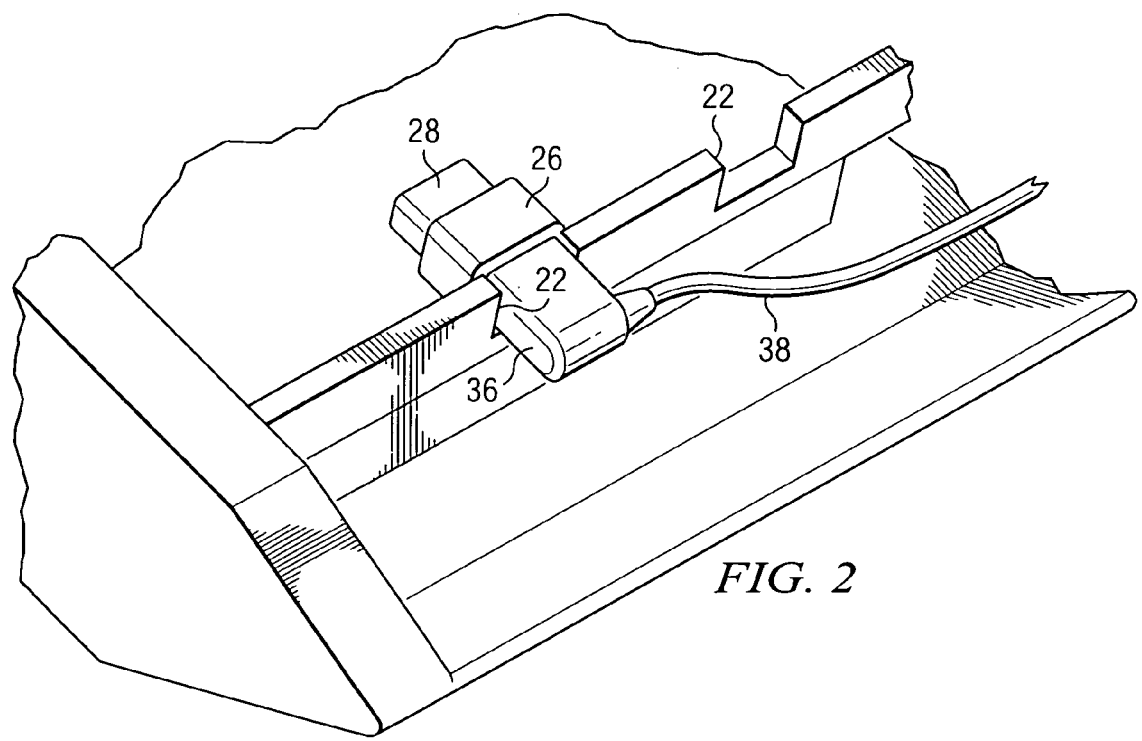
FIG. 2 is an exploded view of a portion of the raised connector supporting member according to one preferred embodiment.

Referring to FIG. 2, there is shown a blown-up view of the connector 26 shown to be frictionally secured within the respective slot 22, the connector 26 having a pair of opposing sidewalls 36 abutting the adjacent sidewalls of the slot 22 to provide a secure setting therewithin, but also allowing the selective removal of the connector 26 from the slot when desired, such as to facilitate the interchanging of tips 30. The connector 26 is further seen to include a power cable 38 providing power thereto from a power source, such as a power converter (not shown).

As shown, the raised member 20 forms a comb-like structure, which may also resemble a fence, and forms a bumper which is abutted by the flanged surface of the connector 26 when the connector 26 is seated in place, as shown. This raised member 20 acts as a physical stop or barricade to keep the portable electronic devices 34 in place, as shown.

Advantageously, the present invention provides an approach that combines simple geometric elements to hold a wide range of portable electronic devices, and also provide easy access for connection. The present invention achieves technical advantages by providing a convenient way to store and charge several types of portable electronic devices simultaneously in one area. The present invention eliminates the need for adjustable clamping mechanisms or specially sized pockets to hold and secure various sized electronic devices in place. The present invention can be produced simply and inexpensively with reduced part count and without any complex moving parts. Further, the present invention does not rely on the portable electronic devices shape, its size or connector locations to hold and secure them in place. The present invention presents the portable electronic devices to the user in an organized cable management system, which is easy to install and remove. Interchangeable tips can be easily exchanged with connectors secured in the upwardly extending member to customize the power connection to a portable electronic device to be powered.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A device for powering/charging portable electronic devices, comprising:
    a platform having an upper major surface;
    an elongated support member extending upwardly from the platform and having a plurality of spaced openings; and
    a plurality of electrical interface connectors, one said interface connector disposed in each of the openings, the interface connectors adapted to provide power to a plurality of portable electronic devices when positioned over the platform.

2. The device as specified in claim 1 wherein the openings are configured as a plurality of slots.

3. The device as specified in claim 2 wherein the support member is configured as a comb.

4. The device as specified in claim 3 wherein the slots open upwardly from the platform.

5. The device as specified in claim 1 further comprising a device connector selectively coupled to one of the interface connectors, wherein the device connector is keyed and configured to couple to at least one predetermined portable electronic device.

6. The device as specified in claim 5 wherein the device connector has a power rating and is configured such that only those portable electronic devices adapted to draw power at a level at or below the device connector power rating can be coupled thereto.

7. The device as specified in claim 1 wherein the platform is angled upwardly from horizontal.

8. The device as specified in claim 1 wherein the interface connectors are configured to be selectively coupled to the support member.

9. The device as specified in claim 6 wherein the at least 2 of the device connectors are configured to provide different maximum power levels.

10. The device as specified in claim 9 wherein the device connectors are configured to provide power to portable electronic devices only if the portable electronic devices are configured to draw power at or below than the connector power rating.

* * * * *